(12) United States Patent
Green et al.

(10) Patent No.: US 10,961,686 B2
(45) Date of Patent: Mar. 30, 2021

(54) SLOPE ASSIST CHASSIS COMPENSATION

(71) Applicant: Caterpillar Trimble Control Technologies LLC, Dayton, OH (US)

(72) Inventors: Francisco Green, New Carlisle, OH (US); Bruce Wiewel, East Peoria, IL (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 247 days.

(21) Appl. No.: 15/994,181

(22) Filed: May 31, 2018

(65) Prior Publication Data

US 2019/0368160 A1 Dec. 5, 2019

(51) Int. Cl.
*E02F 3/84* (2006.01)
*E02F 9/20* (2006.01)
*G01C 9/06* (2006.01)
*G01C 21/20* (2006.01)

(52) U.S. Cl.
CPC ............ *E02F 3/845* (2013.01); *E02F 9/2037* (2013.01); *G01C 9/06* (2013.01); *G01C 21/20* (2013.01); *G05D 2201/0202* (2013.01)

(58) Field of Classification Search
CPC .................. E02F 3/845; E02F 9/2037; G05D 2201/0202; G01C 21/20; G01C 9/06
See application file for complete search history.

(56) References Cited

U.S. PATENT DOCUMENTS 9,222,237 B1 12/2015 Green et al.
9,328,479 B1* 5/2016 Rausch ................... E02F 3/845
9,580,104 B2 2/2017 Green et al.
9,988,787 B1* 6/2018 Wang ................... G01C 21/165
2006/0070746 A1* 4/2006 Lumpkins ............... E02F 3/844
172/2

(Continued)

OTHER PUBLICATIONS

"Case Construction Equipment Announces Sitecontrol Copilot System for Select M-Series Dozers," CASE News, published Jul. 19, 2017, downloaded Oct. 7, 2019, 5 pages. from https://www.casece.com/northamerica/en-us/resources/articles/case-sitecontrol-copilot-system.

(Continued)

*Primary Examiner* — Jessica H Lutz
(74) *Attorney, Agent, or Firm* — Kilpatrick Townsend & Stockton

(57) ABSTRACT

Systems and methods for implementing a machine control system within a construction machine. The machine control system may include a chassis orientation sensor configured to be mounted to a chassis of the construction machine for detecting a chassis pitch angle. The machine control system may also include an implement orientation sensor configured to be mounted to an implement of the construction machine for detecting an implement pitch angle. The machine control system may further include one or more processors configured to perform operations including receiving, from the chassis orientation sensor, the chassis pitch angle, receiving, from the implement orientation sensor, the implement pitch angle, determining a target pitch angle of the implement based on the chassis pitch angle and the implement pitch angle, and causing movement of one or more implement arms so as to set a pitch angle of the implement to the target pitch angle.

12 Claims, 11 Drawing Sheets

(56) References Cited

U.S. PATENT DOCUMENTS

| | | | |
|---|---|---|---|
| 2009/0112410 A1* | 4/2009 | Shull | B25J 9/1664 |
| | | | 701/50 |
| 2016/0230366 A1* | 8/2016 | Hendron | E02F 9/265 |
| 2016/0230367 A1 | 8/2016 | Hendron et al. | |
| 2016/0340872 A1 | 11/2016 | Darukhanavala et al. | |
| 2018/0216316 A1* | 8/2018 | Benson | E02F 3/844 |

OTHER PUBLICATIONS

International Search Report and Written Opinion for Application No. PCT/US2019/034168, dated Aug. 9, 2019, 14 pages.

* cited by examiner

SLOPE ASSIST CHASSIS COMPENSATION

BACKGROUND

Modern construction machines have dramatically increased the efficiency of performing various construction projects. For example, earthmoving machines employing automatic slope control systems are able to grade a project area using fewer passes than what was previously done manually. As another example, modern asphalt pavers and other road makers have allowed replacement of old roads and construction of new roads to occur on the order of hours and days instead of what once took place over weeks and months. Construction crews also now comprise fewer individuals due to the automation of various aspects of the construction process. Much of the technological advances of construction machines are owed in part to the availability of accurate sensors that allow real-time monitoring of the condition and position of a machine's components and/or the environment surrounding the machine. Despite the improvements in modern construction machines, new systems, methods, and techniques are still needed.

SUMMARY

In a first aspect of the present invention, a construction machine is provided. The construction machine may include a chassis. The construction machine may also include an implement coupled to the chassis via one or more implement arms. The construction machine may further include a chassis orientation sensor mounted to the chassis for detecting a chassis pitch angle. The construction machine may further include an implement orientation sensor mounted to the implement for detecting an implement pitch angle. The construction machine may further include one or more processors configured to perform operations. The operations may include receiving, from the chassis orientation sensor, the chassis pitch angle. The operations may also include receiving, from the implement orientation sensor, the implement pitch angle. The operations may further include determining a target pitch angle of the implement based on the chassis pitch angle and the implement pitch angle. The operations may further include causing movement of the one or more implement arms so as to set a pitch angle of the implement to the target pitch angle.

In some embodiments, determining the target pitch angle further includes calculating a difference between the chassis pitch angle and the implement pitch angle and determining the target pitch angle based on the difference. In some embodiments, determining the target pitch angle further includes calculating the difference between the chassis pitch angle and the implement pitch angle at a plurality of different times and determining the target pitch angle based on the difference at the plurality of different times. In some embodiments, determining the target pitch angle further includes calculating a change in the difference between the chassis pitch angle and the implement pitch angle at a plurality of different times and determining the target pitch angle based on the change in the difference at the plurality of different times. In some embodiments, the operations further include receiving, from a global navigation satellite system (GNSS) receiver mounted to the construction machine, a plurality of geospatial positions of the construction machine.

In some embodiments, the target pitch angle is determined further based on the plurality of geospatial positions. In some embodiments, the operations further include prior to determining the target pitch angle and prior to causing movement of the one or more implement arms, determining, based on the plurality of geospatial positions, that the construction machine has moved forward at least a threshold distance such that the chassis is above a portion of a terrain that has been graded by the implement. In some embodiments, the operations further include receiving, from a user input device, a target slope of a terrain. In some embodiments, setting the pitch angle of the implement to the target pitch angle causes the terrain to be graded with the target slope. In some embodiments, the operations further include detecting, by the chassis orientation sensor, the chassis pitch angle and detecting, by the implement orientation sensor, the implement pitch angle.

In a second aspect of the present invention, a machine control system for controlling a pitch angle of an implement of a construction machine is provided. The machine control system may include a chassis orientation sensor configured to be mounted to a chassis of the construction machine for detecting a chassis pitch angle. The machine control system may also include an implement orientation sensor configured to be mounted to an implement of the construction machine for detecting an implement pitch angle, the implement being coupled to the chassis via one or more implement arms. The machine control system may further include one or more processors configured to perform operations. The operations may include receiving, from the chassis orientation sensor, the chassis pitch angle. The operations may also include receiving, from the implement orientation sensor, the implement pitch angle. The operations may further include determining a target pitch angle of the implement based on the chassis pitch angle and the implement pitch angle. The operations may further include causing movement of the one or more implement arms so as to set a pitch angle of the implement to the target pitch angle.

In some embodiments, determining the target pitch angle further includes calculating a difference between the chassis pitch angle and the implement pitch angle and determining the target pitch angle based on the difference. In some embodiments, determining the target pitch angle further includes calculating the difference between the chassis pitch angle and the implement pitch angle at a plurality of different times and determining the target pitch angle based on the difference at the plurality of different times. In some embodiments, the operations further include receiving, from a global navigation satellite system (GNSS) receiver mounted to the construction machine, a plurality of geospatial positions of the construction machine. In some embodiments, the target pitch angle is determined further based on the plurality of geospatial positions.

In a third aspect of the present invention, a method of controlling a pitch angle of an implement of a construction machine is provided. The method may include receiving, from a chassis orientation sensor mounted to a chassis of the construction machine, a chassis pitch angle. In some embodiments, the implement is coupled to the chassis via one or more implement arms. The method may also include receiving, from an implement orientation sensor mounted to the implement, an implement pitch angle. The method may further include determining a target pitch angle of the implement based on the chassis pitch angle and the implement pitch angle. The method may further include causing movement of the one or more implement arms so as to set the pitch angle of the implement to the target pitch angle.

In some embodiments, determining the target pitch angle further includes calculating a difference between the chassis pitch angle and the implement pitch angle and determining the target pitch angle based on the difference. In some embodiments, determining the target pitch angle further includes calculating the difference between the chassis pitch angle and the implement pitch angle at a plurality of different times and determining the target pitch angle based on the difference at the plurality of different times. In some embodiments, determining the target pitch angle further includes calculating a change in the difference between the chassis pitch angle and the implement pitch angle at a plurality of different times and determining the target pitch angle based on the change in the difference at the plurality of different times. In some embodiments, the method further includes receiving, from a global navigation satellite system (GNSS) receiver mounted to the construction machine, a plurality of geospatial positions of the construction machine.

In some embodiments, the target pitch angle is determined further based on the plurality of geospatial positions. In some embodiments, the method further includes prior to determining the target pitch angle and prior to causing movement of the one or more implement arms, determining, based on the plurality of geospatial positions, that the construction machine has moved forward at least a threshold distance such that the chassis is above a portion of a terrain that has been graded by the implement. In some embodiments, the method further includes receiving, from a user input device, a target slope of a terrain, wherein setting the pitch angle of the implement to the target pitch angle causes the terrain to be graded with the target slope. In some embodiments, the method further includes detecting, by the chassis orientation sensor, the chassis pitch angle and detecting, by the implement orientation sensor, the implement pitch angle.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present disclosure relate to systems, methods, and other techniques for implementing a machine control system within a construction machine equipped with an implement. Where the construction machine comprises an earthmoving machine such as a bulldozer, the implement may comprise a large metal plate (e.g., a blade) used to push soil or other such material during road or building construction. The machine control system may be configured to control both the pitch angle (i.e., front to back angle) and the tilt angle (i.e., side to side angle) of the implement in order to grade a surface consistent with a target slope. The implement may be controlled based on data received from two orientation sensors, a first orientation sensor mounted to the implement and a second orientation sensor mounted to the chassis of the construction machine. The machine control system may further include a global navigation satellite system (GNSS) receiver mounted to the chassis for sensing forward motion of the construction machine.

Embodiments of the present disclosure address the problem that arises when the amount of track penetration of the construction machine is unknown. For example, if the pitch angle of the implement was calibrated during zero track penetration (i.e., tracks completely above the terrain), then operating the construction machine during full track penetration (i.e., tracks completely sunken into terrain) will cause the construction machine to grade a slope that continually decreases downward. Similarly, if the pitch angle of the implement was calibrated during complete track penetration, then operating the construction machine during zero track penetration will cause the construction machine to grade a slope that continually increases upward until the implement misses the terrain entirely. Although the problem is particularly prevalent with continuous track machines (construction machines having a continuous band of treads or track plates drive by two or more wheels), other construction machines with large treads may experience varying levels of penetration depending on the hardness or type of terrain.

Figure 1:
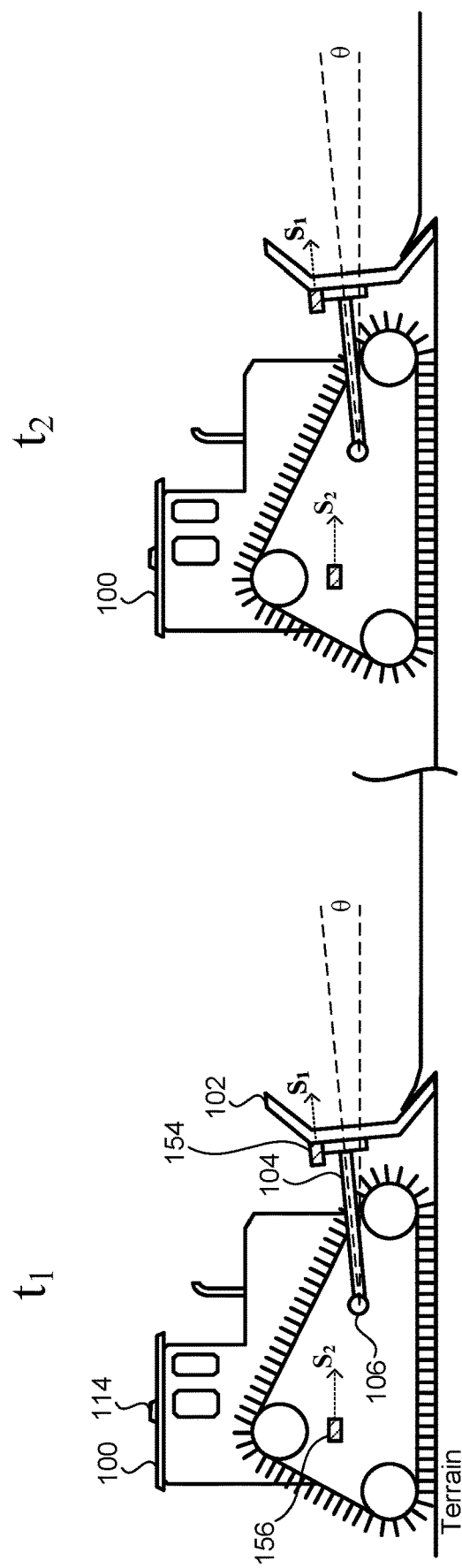
FIG. 1 illustrates a first scenario in which a construction machine attempts to grade a terrain with a level horizontal slope, according to an embodiment of the present disclosure.

FIG. 1 illustrates a first scenario in which a construction machine 100 attempts to grade a terrain with a level horizontal slope. Although illustrated in FIG. 1 as a bulldozer, construction machine 100 may refer to any one of a number of different types of construction machines, including graders, excavators, pavers, compactors, scrapers, loaders, etc., each of which may have components similar to those described in reference to construction machine 100. Construction machine 100 may include an implement 102 connected to the chassis of construction machine 100 via an implement arm 104. In the specific implementation shown in FIG. 1, implement 102 is a bulldozer blade comprising a large metal plate used to push objects or material. Control of implement 102 and implement arm 104 may be realized using an actuator 106 connected to the chassis of construction machine 100 and to implement arm 104 to form a pitch angle θ between implement arm 104 and the base of the chassis. In some embodiments, pitch angle θ may be defined using different reference vectors within construction machine 100. For example, pitch angle θ may be defined as the angle formed between a first reference vector using one or both of the implement arm 104 and the implement 102 (e.g., the top of implement 102, the bottom of implement 102, etc.) and a second reference vector using the chassis of construction machine 100 (e.g., the vector formed by two wheels of construction machine 100).

In some embodiments, construction machine 100 may be calibrated such that setting a particular pitch angle θ may produce a particular target slope. For example, controlling implement arm 104 to set a first pitch angle θ (e.g., 15 degrees) may cause construction machine 100 to grade a surface with a first target slope (e.g., 1% grade), and controlling implement arm 104 to set a second pitch angle θ (e.g., 12 degrees) may cause construction machine 100 to grade a surface with a second target slope (e.g., level horizontal slope). In some instances, the calibration may only be accurate for a certain terrain type and/or terrain condition. For example, if the pitch angle θ was calibrated during zero track penetration, then the calibration may no longer be accurate in muddy conditions where the tracks may penetrate into the terrain. Conversely, if the pitch angle θ was calibrated during complete or partial track penetration, then the calibration may no longer be accurate in conditions in which there is zero track penetration.

These and other issues may be solved by equipping construction machine 100 with two orientation sensors, a first mounted to implement 102 and a second mounted to the chassis. In some embodiments, an implement orientation sensor 154 may be mounted to implement 102 (or implement arm 104) and may generate implement orientation data 155 corresponding to the orientation of implement 102. Implement orientation data 155 may be analyzed by a control box 160 within construction machine 100 to determine an implement pitch angle $S_1$. In addition to implement orientation sensor 154, a chassis orientation sensor 156 may be mounted to the chassis of construction machine 100 and may generate chassis orientation data 157 corresponding to the orientation of the chassis. Chassis orientation data 157 may be analyzed by control box 160 to determine a chassis pitch angle $S_2$. In some embodiments, the implement pitch angle $S_1$ and the chassis pitch angle $S_2$ may each comprise a three-dimensional vector having an X, Y, and, Z component. In other embodiments, or in the same embodiments, the implement pitch angle $S_1$ and the chassis pitch angle $S_2$ may each comprise a single value (e.g., 15 degrees). Although embodiments of the present invention are described in reference to pitch angles, the systems and methods may be equally applicable to the tilt angle of construction machine 100 and/or implement 102.

In some embodiments, construction machine 100 may be equipped with a GNSS receiver 114. In one particular implementation, GNSS receiver 114 is mounted to a highest point of construction machine 100 to increase the signal-to-noise ratio (SNR) of the received GNSS signal. GNSS receiver 114 may be configured to detect a geospatial position 116 of GNSS receiver 114 (and, accordingly, of construction machine 100) which may include a two-dimensional or three-dimensional coordinate corresponding to, for example, an X, Y, and Z position, or a longitude, latitude, and elevation of GNSS receiver 114. GNSS receiver 114 is described further in reference to FIG. 9.

In the scenario illustrated in FIG. 1, at time $t_1$ construction machine 100 sets a pitch angle θ in an attempt to grade the terrain with a level horizontal slope. Because construction machine 100 was calibrated during zero track penetration and construction machine 100 is experiencing zero track penetration between times $t_1$ and $t_2$, construction machine 100 is able to grade the terrain with a level horizontal slope without use of implement orientation sensor 154 and chassis orientation sensor 156.

Figure 2:
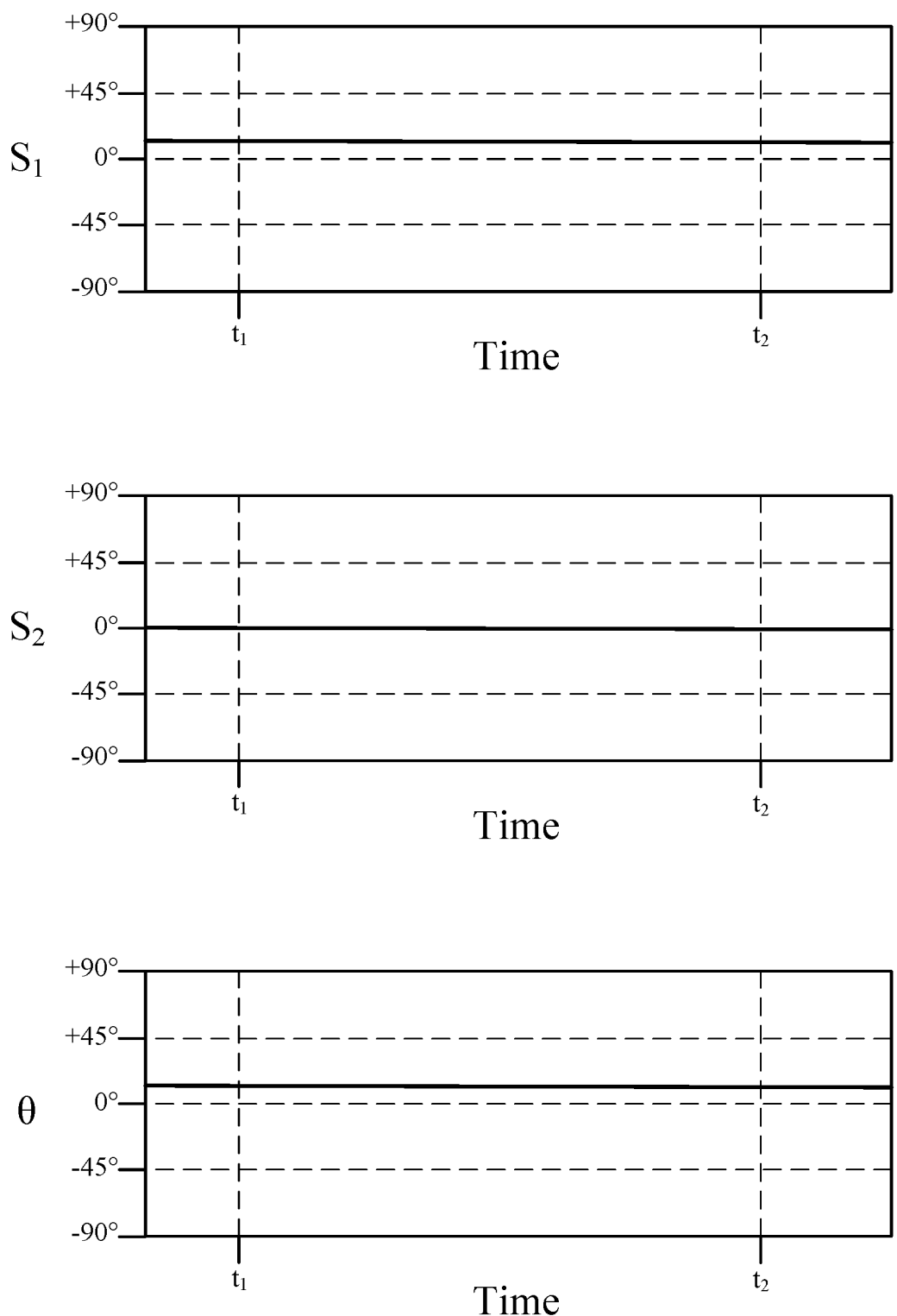
FIG. 2 illustrates various plots corresponding to the scenario illustrated in FIG. 1, according to an embodiment of the present disclosure.

FIG. 2 illustrates various plots corresponding to the scenario illustrated in FIG. 1. The upper plot shows values of the implement pitch angle $S_1$ as measured by implement orientation sensor 154, the middle plot shows values of the chassis pitch angle $S_2$ as measured by chassis orientation sensor 156, and the lower plot shows the set values of the pitch angle θ. Because the terrain is graded with a level horizontal slope, the measured angle values ($S_1$ and $S_2$) and the set angle values remain constant between times $t_1$ and $t_2$. Accordingly, the implement pitch angle $S_1$ the chassis pitch angle $S_2$ do not offer any information for improving the slope of the terrain in this scenario.

Figure 3:
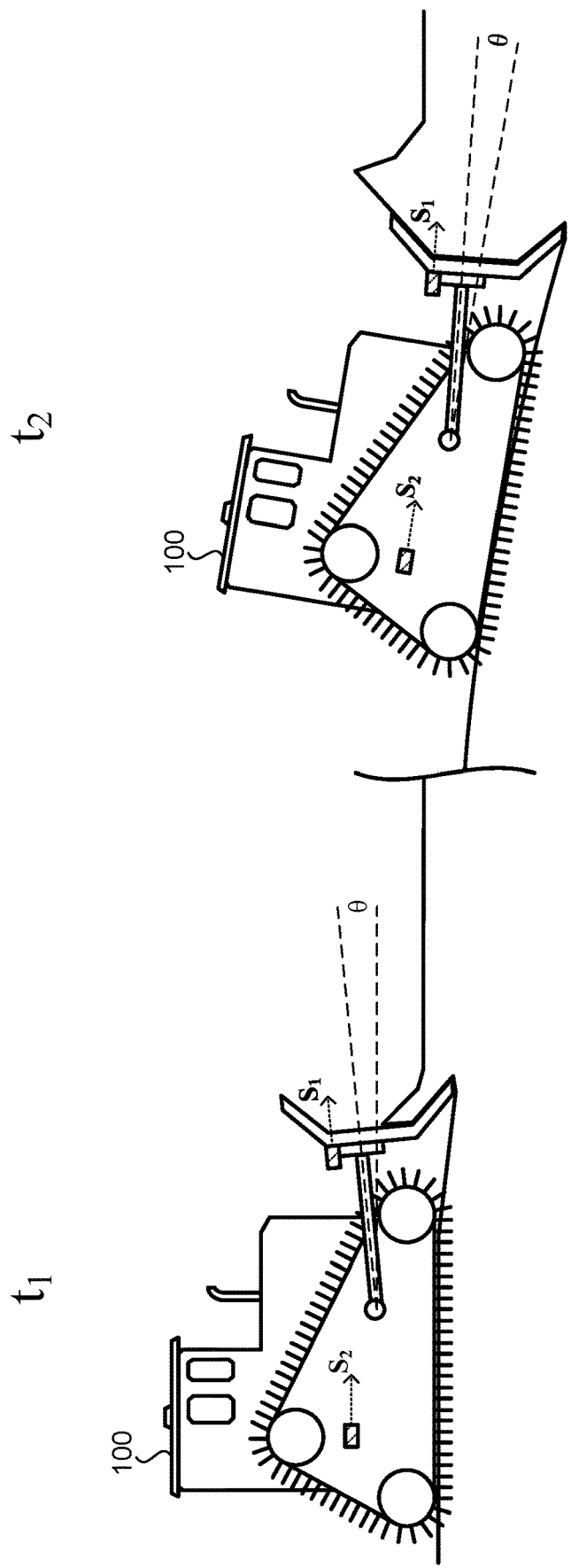
FIG. 3 illustrates a second scenario in which a construction machine attempts to grade a terrain with a level horizontal slope, according to an embodiment of the present disclosure.

FIG. 3 illustrates a second scenario in which construction machine 100 attempts to grade a terrain with a level horizontal slope. At time $t_1$, construction machine 100 sets a pitch angle θ in an attempt to grade the terrain with a level horizontal slope, and the pitch angle θ is held constant between times $t_1$ and $t_2$. Because construction machine 100 was calibrated during zero track penetration and construction machine 100 is experiencing partial track penetration between times $t_1$ and $t_2$, construction machine 100 is caused to grade a slope that continually decreases downward. At some time after time $t_2$, construction machine 100 may become stuck and unable to move further forward.

Figure 4:
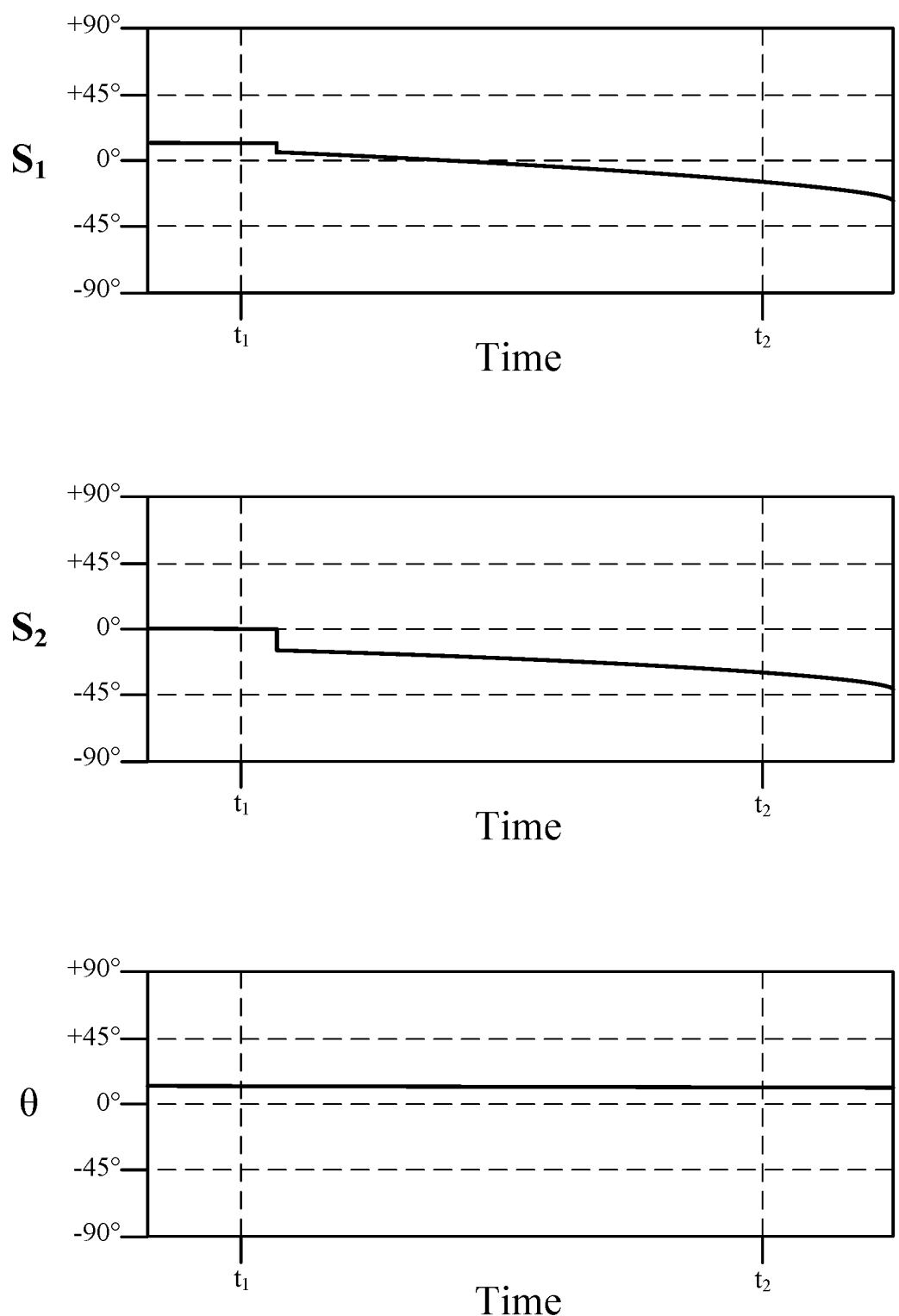
FIG. 4 illustrates various plots corresponding to the scenario illustrated in FIG. 3, according to an embodiment of the present disclosure.

FIG. 4 illustrates various plots corresponding to the scenario illustrated in FIG. 3. The upper plot shows values of the implement pitch angle $S_1$ as measured by implement orientation sensor 154, the middle plot shows values of the chassis pitch angle $S_2$ as measured by chassis orientation sensor 156, and the lower plot shows the set values of the pitch angle θ. Soon after time $t_1$, and prior to time $t_2$, construction machine 100 moves forward and reaches the portion of the terrain that was graded with a downward slope, causing both the implement pitch angle $S_1$ and the chassis pitch angle $S_2$ to abruptly decrease and then gradually decrease. As shown in FIG. 4, neither the implement pitch angle $S_1$ nor the chassis pitch angle $S_2$ are used to modify the pitch angle θ.

Figure 5:
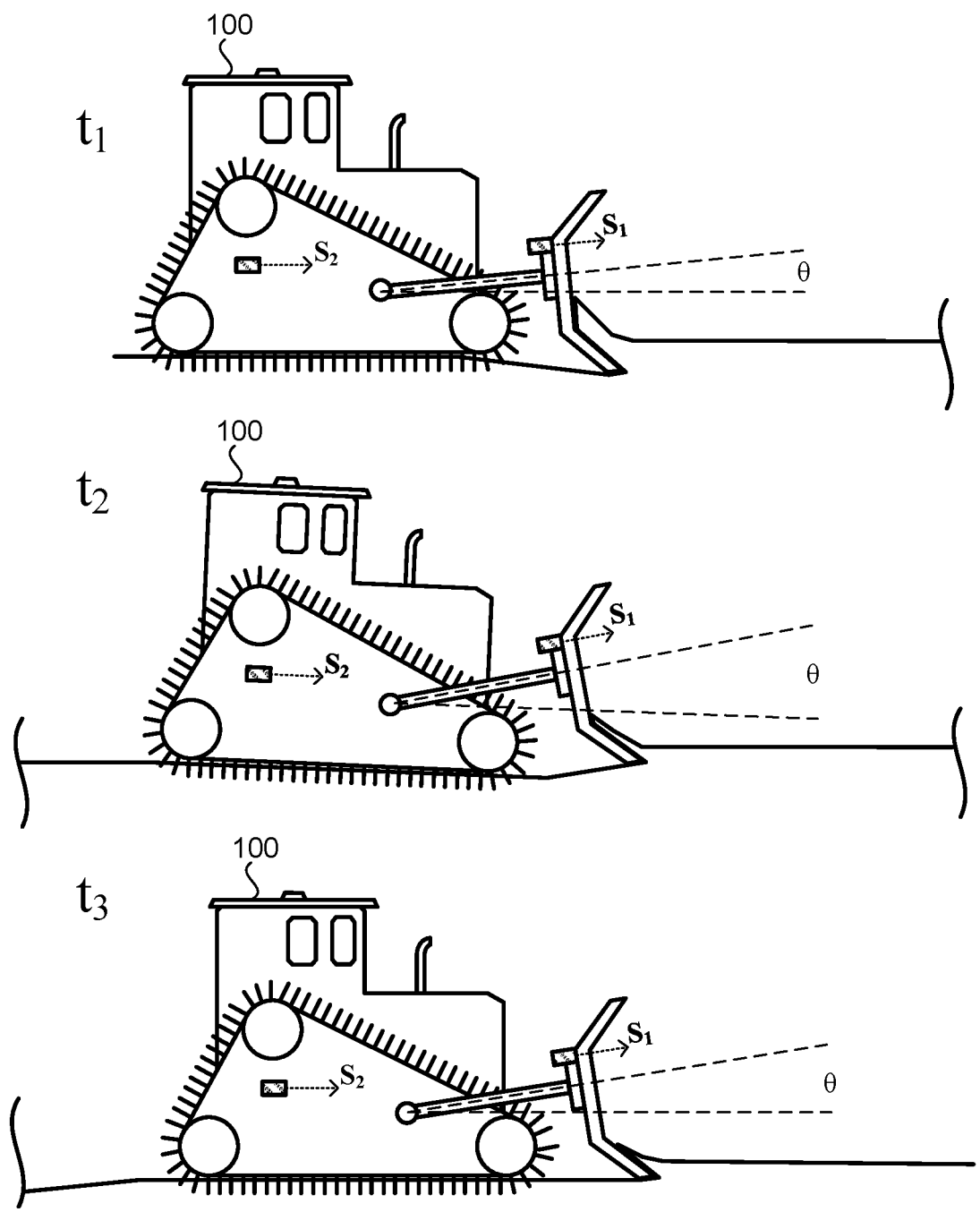
FIG. 5 illustrates a third scenario in which a construction machine attempts to grade a terrain with a level horizontal slope, according to an embodiment of the present disclosure.

FIG. 5 illustrates a third scenario in which construction machine 100 attempts to grade a terrain with a level horizontal slope. The third scenario differs from the first and the second scenarios in that data from implement orientation sensor 154 and chassis orientation sensor 156 (and optionally GNSS receiver 114) are used in controlling the pitch angle θ. At time $t_1$, construction machine 100 initializes the pitch angle θ in an attempt to grade the terrain with a level horizontal slope. Because construction machine 100 was calibrated during zero track penetration and construction machine 100 is experiencing partial track penetration between times $t_1$ and $t_3$, construction machine 100 is caused to grade a slope that initially decreases downward. Soon after time $t_1$, and prior to time $t_2$, construction machine 100 moves forward and reaches the portion of the terrain that was graded with a downward slope, causing both the implement pitch angle $S_1$ and the chassis pitch angle $S_2$ to abruptly decrease. In some instances, a geospatial position 116 of construction machine 100 may be detected using GNSS receiver 114 which may be used to determine that construction machine 100 has moved forward at least a threshold distance such that the chassis is above a portion of the terrain that has been graded by implement 102.

Once it is determined that construction machine 100 has moved forward at least the threshold distance, a target pitch angle may be determined based on the implement pitch angle $S_1$ and the chassis pitch angle $S_2$. In the scenario illustrated in FIG. 5, the target pitch angle is set to the difference between the implement pitch angle $S_1$ and the chassis pitch angle $S_2$ (i.e., $S_1$-$S_2$), and implement arm 104 is controlled so as to set the pitch angle θ to the target pitch angle. Accordingly, at a time between times $t_1$ and $t_2$, the pitch angle θ is increased causing construction machine 100 to grade an upward slope. Soon after time $t_2$, and prior to time $t_3$, construction machine 100 reaches the portion of the terrain that was graded with an upward slope, causing both the implement pitch angle $S_1$ and the chassis pitch angle $S_2$ to abruptly increase. Just prior to time $t_3$, construction machine 100 reaches the portion of the terrain that was graded with a level horizontal slope. Thereafter, construction machine 100 continues to grade the terrain with a level horizontal slope.

Figure 6:
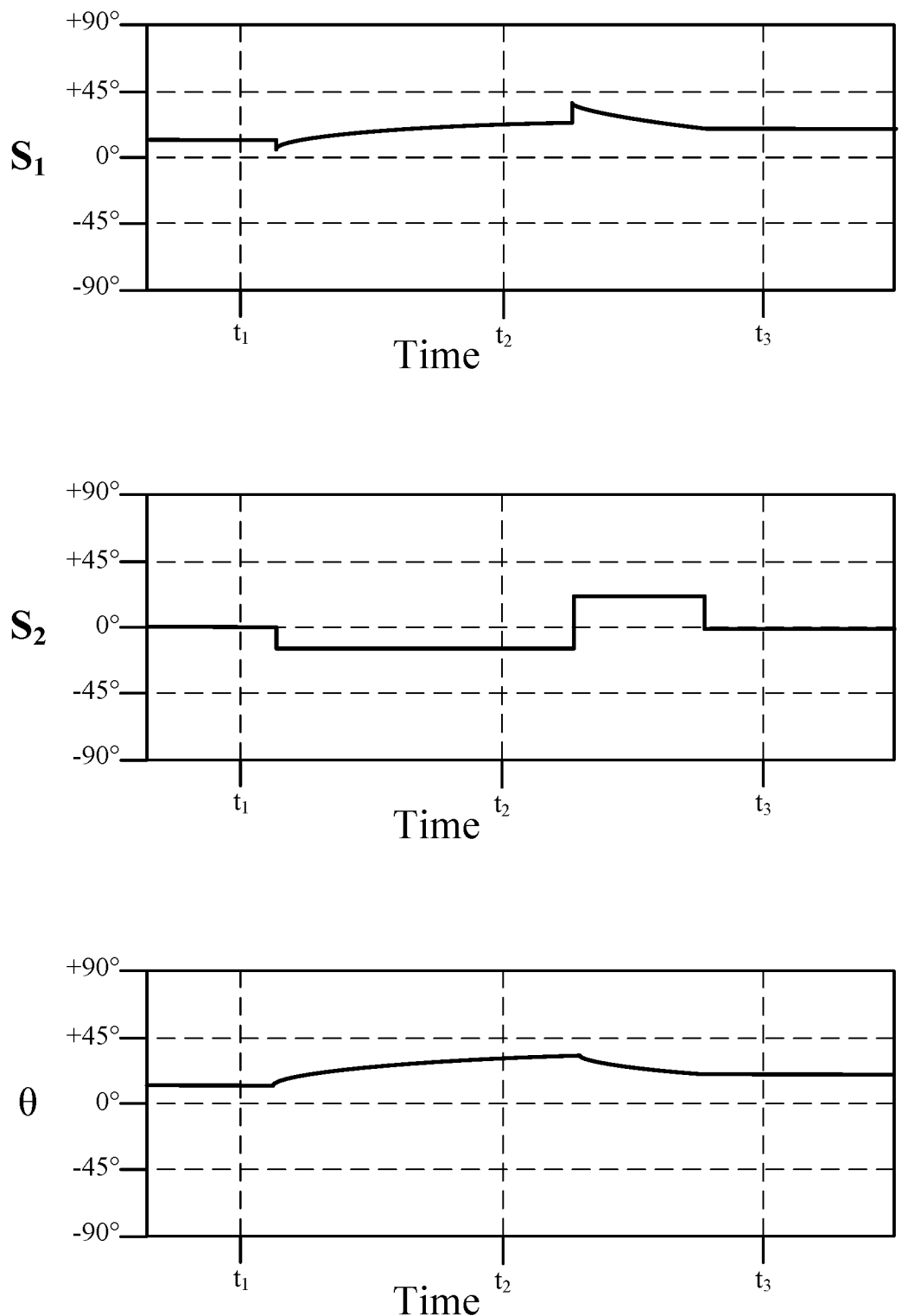
FIG. 6 illustrates various plots corresponding to the scenario illustrated in FIG. 5, according to an embodiment of the present disclosure.

FIG. 6 illustrates various plots corresponding to the scenario illustrated in FIG. 5. The upper plot shows values of the implement pitch angle $S_1$ as measured by implement orientation sensor 154, the middle plot shows values of the chassis pitch angle $S_2$ as measured by chassis orientation sensor 156, and the lower plot shows the set values of the pitch angle θ.

Figure 7:
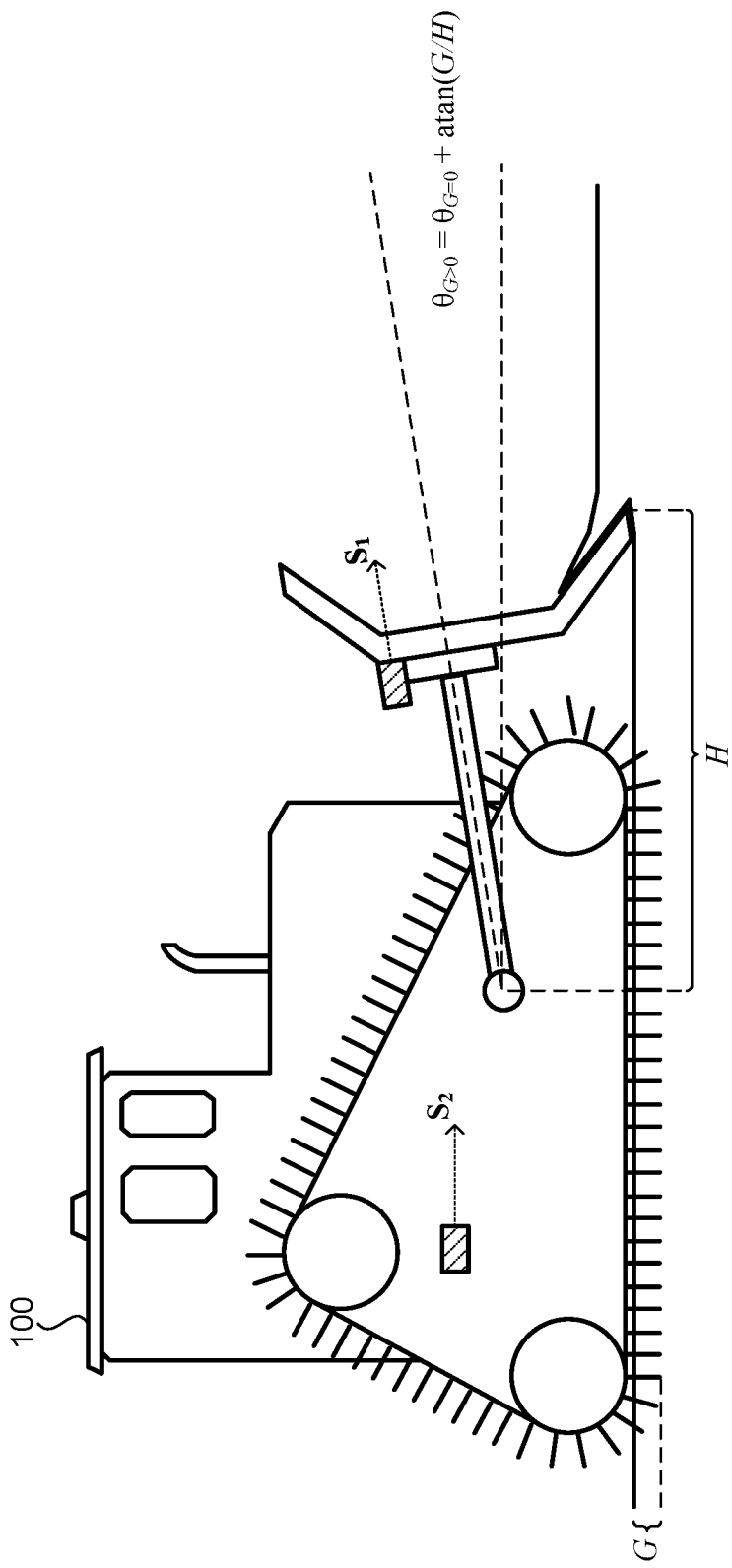
FIG. 7 illustrates a fourth scenario in which a construction machine attempts to grade a terrain with a level horizontal slope, according to an embodiment of the present disclosure.

FIG. 7 illustrates a fourth scenario in which construction machine 100 attempts to grade a terrain with a level horizontal slope. In FIG. 7, control box 160 has knowledge of a track penetration G (vertical distance of how much the tracks of construction machine 100 have penetrated into the terrain) and an implement length H (horizontal distance between actuator 106 and a point of contact between implement 102 and the terrain. In some embodiments, if the pitch angle θ was calibrated during zero track penetration, then the target pitch angle can be set to the calibrated pitch angle+a tan(G/H). Accordingly, if there is no track penetration (i.e., G=0), then the correction amount is equal to 0 (i.e., a tan(0)=0) and the calibrated pitch angle will cause construction machine 100 to grade the terrain with a level horizontal slope. In some embodiments, a depth sensor may be mounted to the bottom of the chassis to detect G.

Figure 8:
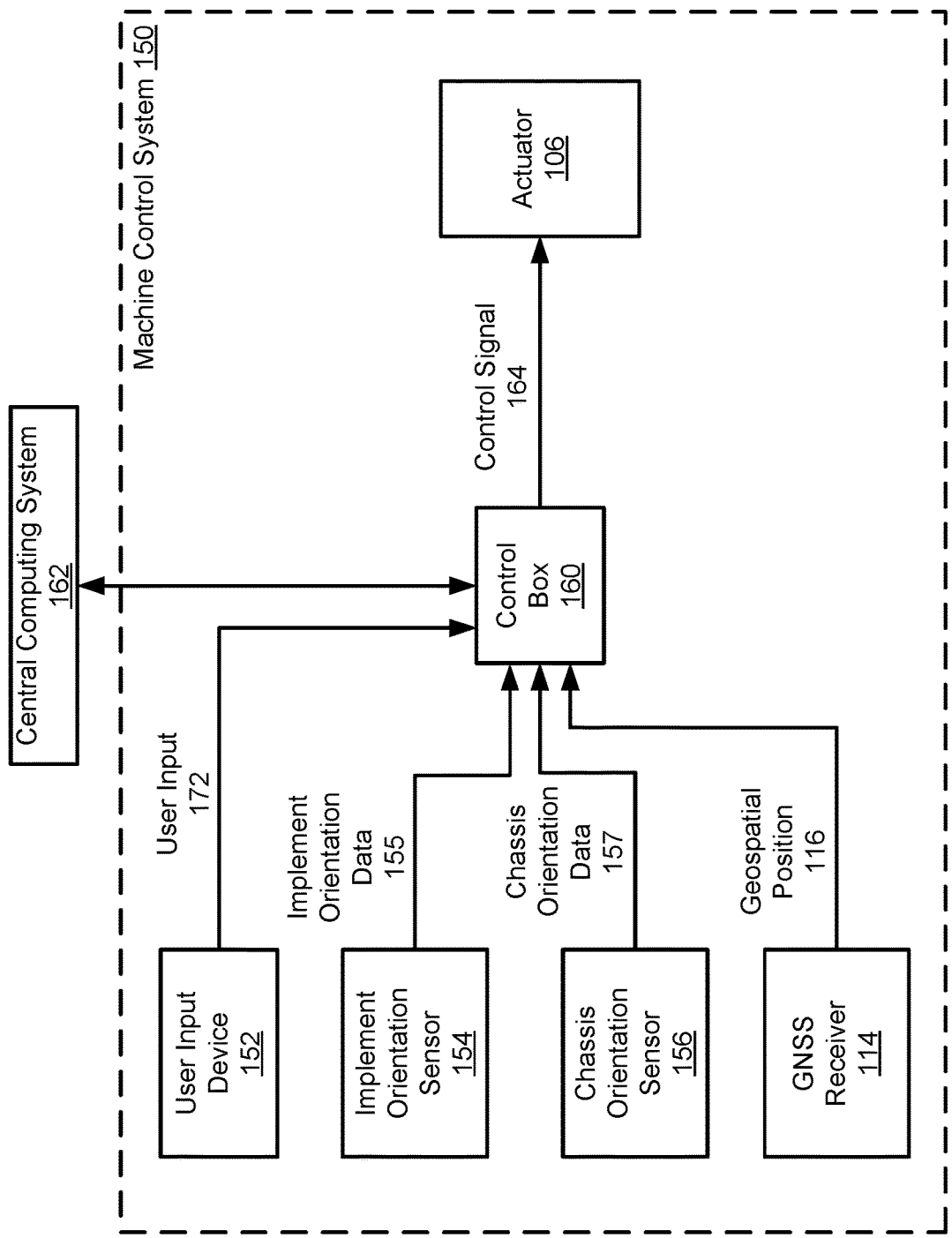
FIG. 8 illustrates a schematic view of a machine control system, according to an embodiment of the present disclosure.

FIG. 8 illustrates a schematic view of a machine control system 150, according to some embodiments of the present disclosure. Machine control system 150 includes various sensors, input devices, actuators, and processors for allowing an operator of construction machine 100 to complete a grading project. The components of machine control system 150 may be mounted to or integrated with the components of construction machine 100 such that construction machine 100 may include machine control system 150. The components of machine control system 150 may be communicatively coupled to each other via any one of various possible wired or wireless connections.

Machine control system 150 may include a control box 160 that receives data from the various sensors and inputs and generates commands that are sent to the various actuators and output devices. Control box 160 may include one or more processors and an associated memory. In some embodiments, control box 160 may be communicatively coupled to a central computing system 162 located external to machine control system 150 and construction machine 100. Central computing system 162 may send instructions to control box 160 of the details of a grading project, such as an area to be graded, a target slope, etc. Central computing system 162 may also send alerts and other general information to control box 160, such as weather conditions, the locations and status of material transfer vehicles, and the like.

In some embodiments, machine control system 150 includes a user input device 152 for receiving a user input 172 from an operator of construction machine 100 and sending user input 172 to control box 160. User input device 152 may be a keyboard, a touchscreen, a touchpad, a switch, a lever, a button, a steering wheel, an acceleration pedal, a brake pedal, and the like. User input device 152 may be mounted to the chassis of construction machine 100, or any other physical part of construction machine 100. User input 172 may indicate a target slope, a desired velocity of construction machine 100, a trajectory of construction machine 100, and the like.

In some embodiments, machine control system 150 includes an implement orientation sensor 154 configured to generate and send implement orientation data 155 to control box 160. In some embodiments, implement orientation data 155 directly includes the implement pitch angle $S_1$. In other embodiments, or in the same embodiments, implement orientation data 155 includes raw data that is processed by control box 160 to generate the implement pitch angle $S_1$ by, for example, integrating raw or filtered acceleration measurements over a period of time. In some embodiments, implement orientation sensor 154 includes one or more accelerometers and/or one or more gyroscopes packaged separately in individual units or together in an inertial measurement unit (IMU).

In some embodiments, machine control system 150 includes an chassis orientation sensor 156 configured to generate and send chassis orientation data 157 to control box 160. In some embodiments, chassis orientation data 157 directly includes the chassis pitch angle $S_2$. In other embodiments, or in the same embodiments, chassis orientation data 157 includes raw data that is processed by control box 160 to generate the chassis pitch angle $S_2$ by, for example, integrating raw or filtered acceleration measurements over a period of time. In some embodiments, chassis orientation sensor 156 includes one or more accelerometers and/or one or more gyroscopes packaged separately in individual units or together in an IMU.

In some embodiments, machine control system 150 includes a GNSS receiver 114 configured to generate and send a geospatial position 116 of construction machine 100 to control box 160. In some embodiments, geospatial position 116 is determined by processing raw data received from GNSS receiver 114.

In some embodiments, machine control system 150 includes an actuator 106 connected to the chassis of construction machine 100. Actuator 106 may be configured to cause movement of implement arm 104 and/or implement 102. In one particular implementation, actuator 106 may be a hydraulic cylinder. In other embodiments, or in the same embodiments, actuator 106 may comprise any type of hydraulic, pneumatic, electric, magnetic, and/or mechanical actuator. Actuator 106 may receive a control signal 164 from control box 160, which may be a direct current (DC) or alternating current (AC) voltage and, in some embodiments, may be an information-containing signal. Upon receiving control signal 164, actuator 106 may move according to a linear, rotatory, or oscillatory motion, among other possibilities. In some embodiments, actuator 106 may generate a status signal that is sent to control box 160. The status signal may indicate a current operating position of actuator 104 such as the pitch angle θ.

Figure 9:
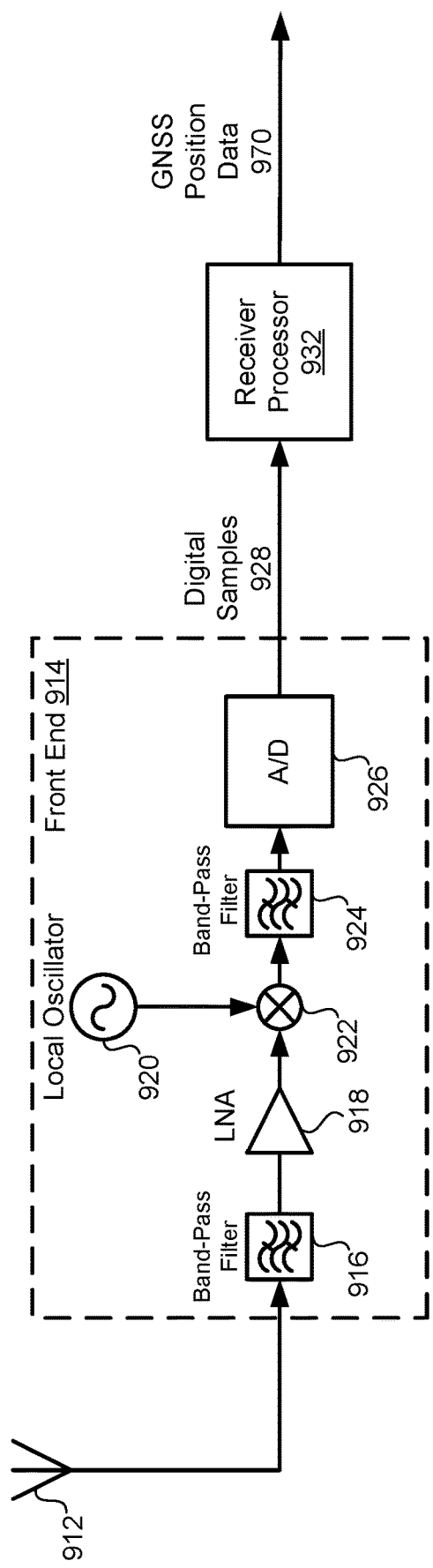
FIG. 9 illustrates a block diagram of a GNSS receiver, according to an embodiment of the present disclosure.

FIG. 9 illustrates a block diagram of GNSS receiver 114, according to some embodiments of the present disclosure. In some embodiments, GNSS receiver 114 includes antenna 912 for receiving wireless signals and sending/routing a signal related to the wireless signals to an RF front end 914. Antenna 912 may be linearly or circularly polarized, may be mounted or embedded, may be a single antenna or an array antenna, may have a narrow or wide bandwidth, among other possibilities. RF front ends are well known in the art, and in some instances include a band-pass filter 916 for initially filtering out undesirable frequency components outside the frequencies of interest, a low-noise amplifier (LNA) 918 for amplifying the received signal, a local oscillator 920 and a mixer 922 for down converting the received signal from RF to intermediate frequencies (IF), a band-pass filter 924 for removing frequency components outside IF, and an analog-to-digital (A/D) converter 926 for sampling the received signal to generate digital samples 928.

In some instances, RF front end 914 includes additional or fewer components than that shown in FIG. 9. For example, RF front end 914 may include a second local oscillator (90 degrees out of phase with respect to local oscillator 920), a second mixer, a second band-pass filter, and a second A/D converter for generating digital samples corresponding to the quadrature component of the received wireless signals. Digital samples corresponding to the in-phase component of the received wireless signals and digital samples corresponding to the quadrature component of the received wireless signals may both be sent to receiver processor 932. In some embodiments, digital samples corresponding to both in-phase and quadrature components may be included in digital samples 928. In some embodiments, receiver processor 932 may include one or more correlators.

Other components within RF front end 914 may include a phase-locked loop (PLL) for synchronizing the phase of local oscillator 920 with the phase of the received signal, and a phase shifter for generating a second mixing signal using local oscillator 920 that is 90 degrees out of phase with local oscillator 920. In some embodiments, RF front end 914 does not include band-pass filter 916 and LNA 918. In some embodiments, A/D converter 926 is coupled directly to antenna 912 and samples the RF signal directly without down-conversion to IF. In some embodiments, RF front end 914 only includes band-pass filter 916 and A/D converter 926. Other possible configurations of RF front end 914 are possible.

Digital samples 928 generated by RF front end 914 are sent to receiver processor 932. In some embodiments, receiver processor 932 performs one or more correlations on digital samples 928 using local codes to generate distance estimates between GNSS receiver 114 and various GNSS satellites. In some embodiments, one or more components of receiver processor 932 (such as, for example, one or more correlators) include specific pieces of hardware, such as an application-specific integrated circuit (ASIC) or a field-programmable gate array (FPGA). In some embodiments, operations performed by receiver processor 932 are performed entirely in software using digital signal processing (DSP) techniques. After generating the distance estimates, receiver processor 932 may perform trilateration to generate a position estimate for GNSS receiver 114. After generating at least one position estimate, receiver processor 932 may output GNSS position data 970 comprising a plurality of GNSS points (i.e., position estimates). Each of the plurality of GNSS points may be a three-dimensional coordinate represented by three real numbers. In some embodiments, the three numbers may correspond to latitude, longitude, and elevation. In other embodiments, the three numbers may correspond to X, Y, and Z positions. GNSS position data 970 may be outputted to be displayed to a user, sent to control box 160 via a wired or wireless connection, or further processed, among other possibilities.

Figure 10:
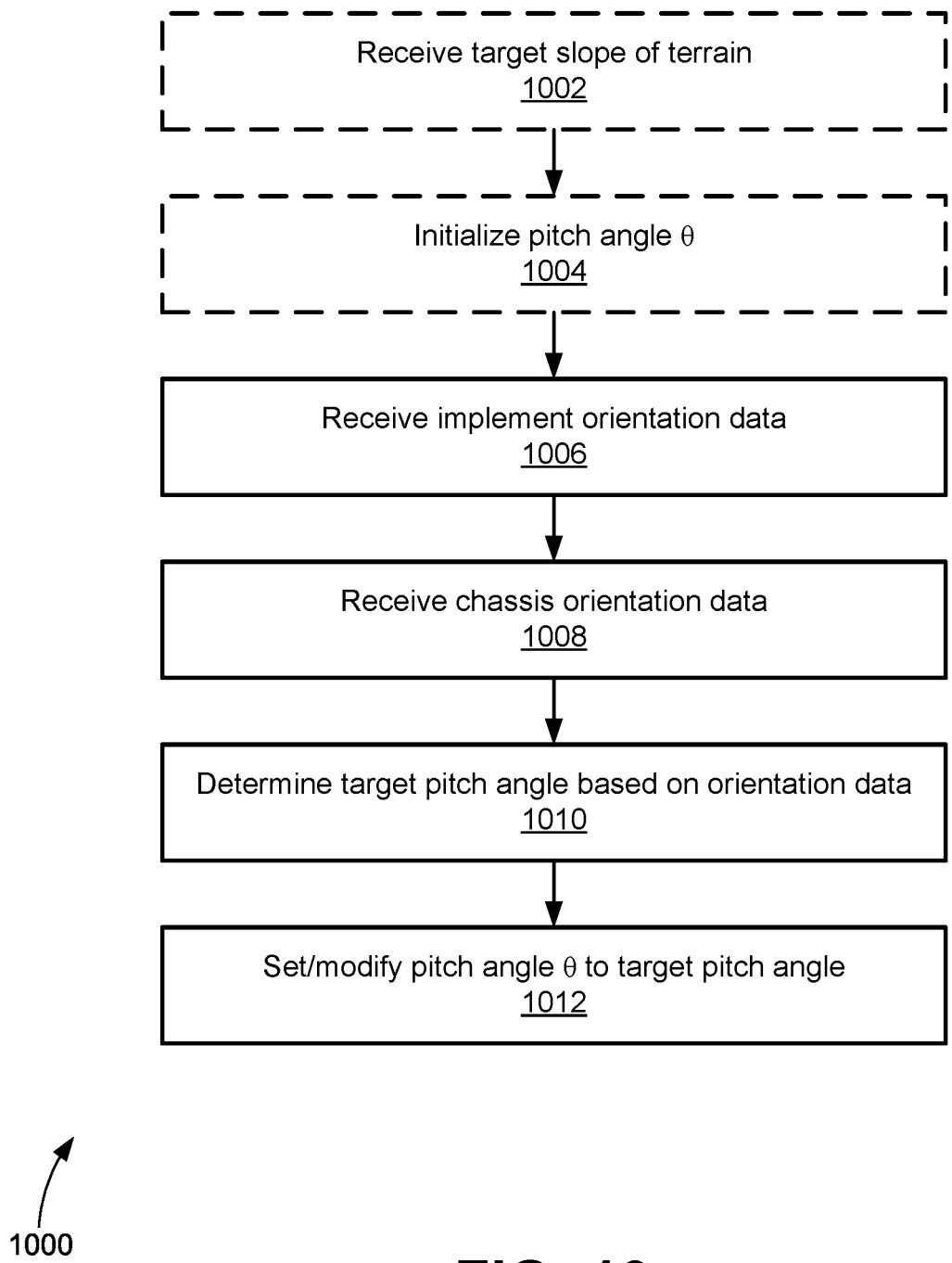
FIG. 10 illustrates a method of controlling a pitch angle θ of a construction machine, according to an embodiment of the present disclosure.

FIG. 10 illustrates a method 1000 of controlling the pitch angle θ of construction machine 100, according to some embodiments of the present disclosure. Steps of method 1000 need not be performed in the order shown, and not all steps need be performed during performance of method 1000. One or more steps of method 1000 may be performed or facilitated by one or more processors located within control box 160.

At step 1002, a target slope of a terrain is received by control box 160 from either user input device 152 or central computing system 162. For example, user input 172 may indicate a single target slope (e.g., 2% grade) that is entered into a keypad positioned within construction machine 100.

At step 1004, the pitch angle θ is initialized based on the target slope. In some embodiments, initializing the pitch angle θ may include causing movement of implement arm 104 using actuator 106 so as to set the pitch angle θ to a calibrated pitch angle. For example, construction machine 100 may be calibrated such that setting a particular pitch angle θ may produce a particular target slope. Construction machine 100 may be calibrated during zero track penetration, complete track penetration, partial track penetration, among other possibilities.

At step 1006, implement orientation data 155 is received by control box 160 from implement orientation sensor 154. Implement orientation data 155 may directly or indirectly include the implement pitch angle $S_1$ at a single time, at a plurality of times, over a range of times, and the like. For example, control box 160 may receive the implement pitch angle $S_1(t)$ as a function of time.

At step 1008, chassis orientation data 157 is received by control box 160 from chassis orientation sensor 156. Chassis orientation data 155 may directly or indirectly include the chassis pitch angle $S_2$ at a single time, at a plurality of times, over a range of times, and the like. For example, control box 160 may receive the chassis pitch angle $S_2(t)$ as a function of time.

At step 1010, a target pitch angle is determined by control box 160 based on implement orientation data 155 and/or chassis orientation data 157. Specifically, the target pitch angle may be determined based on the implement pitch angle $S_1$ and/or the chassis pitch angle $S_2$ by, for example, calculating the difference between the two at a single time, at a plurality of times, or over a range of times, etc. In one particular implementation, the target pitch angle is set to the difference between the implement pitch angle $S_1$ and the chassis pitch angle $S_2$. In another implementation, the target pitch angle is set to the difference between the implement pitch angle $S_1$ and the chassis pitch angle $S_2$ multiplied by a scaling constant k. In some implementations, the target pitch angle may be adjusted (e.g., increased or decreased from a previous target pitch angle) by the difference between the implement pitch angle $S_1$ and/or the chassis pitch angle $S_2$.

In some embodiments, the target pitch angle may be determined based on the change (the first derivative) in the difference between the implement pitch angle $S_1$ and the chassis pitch angle $S_2$ at a single time, at a plurality of times, or over a range of times. For example, if the change in the difference between the implement pitch angle $S_1$ and the chassis pitch angle $S_2$ is positive at a particular time (the implement pitch angle $S_1$ and the chassis pitch angle $S_2$ are moving apart), then the target pitch angle may be increased from a previous target pitch angle. Similarly, if the change in the difference between the implement pitch angle $S_1$ and the chassis pitch angle $S_2$ is negative at a particular time (the implement pitch angle $S_1$ and the chassis pitch angle $S_2$ are coming closer together), then the target pitch angle may be decreased from a previous target pitch angle.

In some embodiments, step 1010 is only performed after it is determined by control box 160 that construction machine 100 has moved forward at least a threshold distance such that the chassis is above a portion of the terrain that has been graded by implement 102. In some instances, this determination is made by control box 160 using geospatial position 116 received from GNSS receiver 114. For example, control box 160 may receive a first geospatial position from GNSS receiver 114 when construction machine 100 begins moving forward and later may receive a second geospatial position from GNSS receiver 114 once construction machine 100 has moved forward exactly the threshold distance. In some embodiments, control box 160 may receive a plurality of geospatial positions 116 from GNSS receiver 114 while construction machine 100 is moving forward. In some instances, the threshold distance is set equal to the horizontal length of construction machine 100, the horizontal length including the current position of implement 102 (as determined by the pitch angle θ). By performing step 1010 exactly when construction machine 100 has moved forward the horizontal length of construction machine 100 (i.e., the threshold distance), the amount of time for construction machine 100 to begin grading with the target slope may be significantly reduced, thereby reducing costs associated with a grading project.

In some embodiments, the determination that construction machine 100 has moved forward at least the threshold distance is made by control box 160 using data from any one of a variety of sensors mounted to construction machine 100 or positioned externally to construction machine 100. Possible sensors include, but are not limited to, a position-measuring sensor, a velocity-measuring sensor, an acceleration-measuring sensor, a theodolite, a radar sensor, a rotation sensor (e.g., configured to detect rotation of one or more wheels or gears of construction machine 100 to determine distance travelled), an ultrasonic sensor, and the like. In some embodiments, the manufacturer of one or more components of construction machine 100 may provide vehicle movement information to control box 160. Other possibilities are contemplated.

At step 1012, control box 160 sends control signal 164 to actuator 106 to cause movement of implement arm 104 so as to set the pitch angle θ to the target pitch angle. In some instances, the pitch angle θ is immediately set to the target pitch angle. In other embodiments, or in the same embodiments, the pitch angle θ is gradually (e.g., linearly) set to the target pitch angle. In some embodiments, an error is calculated using the equation: target pitch angle=pitch angle θ+k*error, where k is selected to drive the error to zero. For example, a larger or smaller value of k may change the speed at which the pitch angle θ approaches the target pitch angle, which may depend largely on the response time of actuator 106. In some embodiments, the error is calculated using the equation: new target pitch angle=previous target pitch angle+k*(chassis pitch angle $S_2$—target slope of the terrain), where again k is selected to drive the error (the quantity in the parenthetical) to zero.

Figure 11:
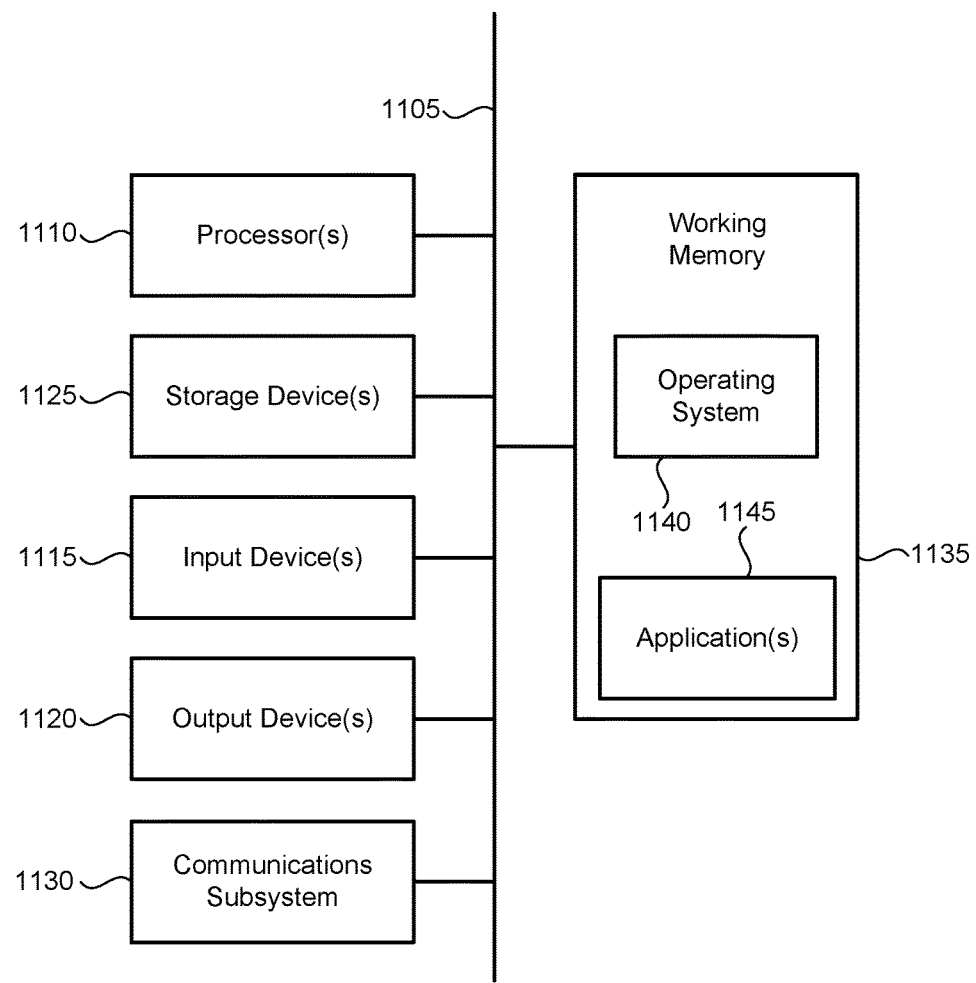
FIG. 11 illustrates a simplified computer system, according to an embodiment of the present disclosure.

FIG. 11 illustrates a simplified computer system 1100, according to some embodiments of the present disclosure. Computer system 1100 as illustrated in FIG. 11 may be incorporated into devices such as control box 160, central computing system 162, user input device 152, implement orientation sensor 154, chassis orientation sensor 156, GNSS receiver 114, or some other device described herein. FIG. 11 provides a schematic illustration of one embodiment of computer system 1100 that can perform some or all of the steps of the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or more integrated manner.

Computer system 1100 is shown comprising hardware elements that can be electrically coupled via a bus 1105, or may otherwise be in communication, as appropriate. The hardware elements may include one or more processors 1110, including without limitation one or more general-purpose processors and/or one or more special-purpose processors such as digital signal processing chips, graphics acceleration processors, and/or the like; one or more input devices 1115, which can include, without limitation a mouse, a keyboard, a camera, and/or the like; and one or more output devices 1120, which can include, without limitation a display device, a printer, and/or the like.

Computer system 1100 may further include and/or be in communication with one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1100 might also include a communications subsystem 1130, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1130 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1130. In other embodiments, a portable electronic device, e.g. the first electronic device, may be incorporated into computer system 1100, e.g., an electronic device as an input device 1115. In some embodiments, computer system 1100 will further comprise a working memory 1135, which can include a RAM or ROM device, as described above.

Computer system 1100 also can include software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1125 described above. In some cases, the storage medium might be incorporated within a computer system, such as computer system 1100. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1100 and/or might take the form of source and/or installable code, which, upon compilation and/or installation on computer system 1100 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1100 to perform methods in accordance with various embodiments of the technology. According to a set of embodiments, some or all of the procedures of such methods are performed by computer system 1100 in response to processor 1110 executing one or more sequences of one or more instructions, which might be incorporated into the operating system 1140 and/or other code, such as an application program 1145, contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1100.

The communications subsystem 1130 and/or components thereof generally will receive signals, and the bus 1105 then might carry the signals and/or the data, instructions, etc. carried by the signals to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A construction machine comprising:
    a chassis;
    an implement coupled to the chassis via one or more implement arms;
    a chassis orientation sensor mounted to the chassis for detecting a chassis pitch angle;
    an implement orientation sensor mounted to the implement for detecting an implement pitch angle; and
    one or more processors configured to perform operations comprising:
        receiving, from the implement orientation sensor, the implement pitch angle;
        determining a pitch angle θ of the implement based on the implement pitch angle;
        causing movement of the one or more implement arms so as to set the pitch angle θ of the implement to a first target pitch angle;
        receiving, from the chassis orientation sensor, the chassis pitch angle;
        determining an error between the chassis pitch angle and a target slope of a terrain;
        determining a second target pitch angle of the implement based on the first target pitch angle and the error; and
        causing movement of the one or more implement arms so as to set the pitch angle θ of the implement to the second target pitch angle.

2. The construction machine of claim 1, wherein the operations further comprise:
    receiving, from a global navigation satellite system (GNSS) receiver mounted to the construction machine, a plurality of geospatial positions of the construction machine, wherein the second target pitch angle is determined further based on the plurality of geospatial positions.

3. The construction machine of claim 2, wherein the operations further comprise:
    prior to determining the second target pitch angle and prior to causing movement of the one or more implement arms, determining, based on the plurality of geospatial positions, that the construction machine has moved forward at least a threshold distance such that the chassis is above a portion of the terrain that has been graded by the implement.

4. The construction machine of claim 1, wherein the operations further comprise:
    receiving, from a user input device, the target slope of the terrain.

5. The construction machine of claim 1, wherein the operations further comprise:
    detecting, by the chassis orientation sensor, the chassis pitch angle; and
    detecting, by the implement orientation sensor, the implement pitch angle.

6. A machine control system for controlling a pitch angle θ of an implement of a construction machine, the machine control system comprising:
    a chassis orientation sensor configured to be mounted to a chassis of the construction machine for detecting a chassis pitch angle;
    an implement orientation sensor configured to be mounted to the implement of the construction machine for detecting an implement pitch angle, the implement being coupled to the chassis via one or more implement arms; and
    one or more processors configured to perform operations comprising:
        receiving, from the implement orientation sensor, the implement pitch angle;
        determining a pitch angle θ of the implement based on the implement pitch angle;
        causing movement of the one or more implement arms so as to set the pitch angle θ of the implement to a first target pitch angle;
        receiving, from the chassis orientation sensor, the chassis pitch angle;
        determining an error between the chassis pitch angle and a target slope of a terrain;
        determining a second target pitch angle of the implement based on the first target pitch angle and the error; and
        causing movement of the one or more implement arms so as to set the pitch angle θ of the implement to the second target pitch angle.

7. The machine control system of claim 6, wherein the operations further comprise:
    receiving, from a global navigation satellite system (GNSS) receiver mounted to the construction machine, a plurality of geospatial positions of the construction machine, wherein the second target pitch angle is determined further based on the plurality of geospatial positions.

8. A method of controlling a pitch angle θ of an implement of a construction machine, the method comprising:
    receiving, from an implement orientation sensor mounted to the implement, an implement pitch angle;

determining a pitch angle θ of the implement based on the implement pitch angle;

causing movement of one or more implement arms of the construction machine so as to set the pitch angle θ of the implement to a first target pitch angle;

receiving, from a chassis orientation sensor mounted to a chassis of the construction machine, a chassis pitch angle, wherein the implement is coupled to the chassis via the one or more implement arms;

determining an error between the chassis pitch angle and a target slope of a terrain:

determining a second target pitch angle of the implement based on the first target pitch angle and the error; and causing movement of the one or more implement arms so as to set the pitch angle θ of the implement to the second target pitch angle.

9. The method of claim 8, further comprising:

receiving, from a global navigation satellite system (GNSS) receiver mounted to the construction machine, a plurality of geospatial positions of the construction machine, wherein the second target pitch angle is determined further based on the plurality of geospatial positions.

10. The method of claim 9, further comprising:

prior to determining the second target pitch angle and prior to causing movement of the one or more implement arms, determining, based on the plurality of geospatial positions, that the construction machine has moved forward at least a threshold distance such that the chassis is above a portion of the terrain that has been graded by the implement.

11. The method of claim 8, further comprising:

receiving, from a user input device, the target slope of the terrain.

12. The method of claim 8, further comprising:

detecting, by the chassis orientation sensor, the chassis pitch angle; and detecting, by the implement orientation sensor, the implement pitch angle.

\* \* \* \* \*